United States Patent [19]
Jansen et al.

[11] Patent Number: 5,766,336
[45] Date of Patent: Jun. 16, 1998

[54] COLORED PIGMENTS BASED ON OXIDE-NITRIDES, THE PREPARATION AND USE THEREOF

[75] Inventors: Martin Jansen; Hans-Peter Letschert, both of Bonn, Germany

[73] Assignee: Cerdec Aktiengesellschaft Keramische Farben, Frankfurt, Germany

[21] Appl. No.: 518,599

[22] Filed: Aug. 21, 1995

[30] Foreign Application Priority Data

Aug. 19, 1994 [DE] Germany ............... 44 29 532.4

[51] Int. Cl.$^6$ .............. C09C 1/00; B01B 21/20
[52] U.S. Cl. ............ 106/461; 106/401; 106/425; 106/426; 106/428; 106/430; 106/431; 106/436; 106/438; 106/439; 106/440; 106/441; 106/442; 106/444; 106/446; 106/449; 106/450; 106/451; 106/453; 106/454; 106/456; 106/459; 106/457; 106/461; 106/467; 106/466; 106/479; 106/480; 106/482; 106/483; 423/400; 423/409; 423/263; 423/385
[58] Field of Search ............. 106/400, 401, 106/425, 426, 428, 430, 431, 436, 439, 466, 479, 480, 483, 441, 442, 446, 450, 453, 456, 461, 457, 438, 440, 444, 449, 451, 454, 459, 467; 423/385, 400, 409, 263; 501/96

[56] References Cited

U.S. PATENT DOCUMENTS

| 4,734,390 | 3/1988 | Marchand et al. ............ 423/385 |
| 5,439,660 | 8/1995 | Jansen et al. ............ 423/263 |

FOREIGN PATENT DOCUMENTS

| 0 184 951 | 6/1986 | European Pat. Off. . |
| 0 238 338 | 9/1987 | European Pat. Off. . |
| 0 286 503 | 10/1988 | European Pat. Off. . |
| 2 573 060 | 5/1986 | France . |
| 3 443 622 | 5/1986 | Germany . |

OTHER PUBLICATIONS

Pors et al., Journal of Solid State Chemistry, vol. 107 (1) pp. 39–42 (1993) (no month).

Marchand et al., Annales de Chimie, vol. 16 No. 7 (1991) pp.553–560 (no month).

Hellwig et al., Journal of Materials Science, vol. 29, No. 18 15 Sep. 1994.

*Primary Examiner*—Michael Marcheschi
*Attorney, Agent, or Firm*—Wenderoth, Lind & Ponack

[57] ABSTRACT

Colored pigments are provided from the green-yellow to red spectrum based on oxide-nitrides with two or three different cations Q, R and S in the crystal lattice, wherein the nitrogen to oxygen atomic ratio is determinative for the color. These pigments crystallise in the pyrochlore, spinel or elpasolite structure. Pigments in the perovskite are as provided with increased color brilliance. The color of the pigments can be adjusted in a wide range of the color spectrum during their preparation within a substance class with the cations Q, R and S and while retaining the crystal structure, by increasing or lowering the atomic ratio N to O in the oxide-nitride and bringing about the required charge balancing by replacing an equivalent quantity of the cation Q with the valency q by a cation R with the valency q+1. In order to prepare the pigments, a mixture of oxide-nitride-forming metal compounds in the atomic ratio of the cations according to the structural formula is calcined, preferably in the presence of mineralizers, under nitriding conditions at 700°–1250° C.

10 Claims, 3 Drawing Sheets

COLORED PIGMENTS BASED ON OXIDE-NITRIDES, THE PREPARATION AND USE THEREOF

DESCRIPTION

The invention relates to a process for adjusting the colour of coloured pigments based on oxide-nitrides during the preparation thereof, to the coloured pigments obtainable according to the process, particularly coloured pigments from the yellow to red colour spectrum with increased colour brilliance, and the use thereof.

BACKGROUND OF THE INVENTION

Coloured pigments are subject to various drawbacks depending on the type of application and use of the articles coloured therewith. Articles which are coloured with pigments based on heavy metal compounds containing oxides, sulphides or selenides or which are decorated using said compounds may, on contact with acid or alkaline solutions, release toxic constituents, for example, nickel, cobalt or chromium from spinels, and cadmium from cadmium sulphide yellow, and cadmium and selenium from cadmium sulphoselenide red or orange. A further problem is the release of toxic heavy metals when articles coloured therewith are dumped or burnt in waste incinerators. There is a particular interest in finding pigments in the yellow to red spectral range which contain constituents that are less toxic than the above-mentioned cadmium pigments. During the preparation of a whole range of pigments covering a relatively large part of the colour spectrum, it is of interest from an economic angle to be able to adjust the colour in a reliable manner by varying the quantities of individual raw materials, as can be done in the case of Cd(S, Se).

Nitrides and oxide-nitrides are known from FR-A 2 573 060, which crystallise in the perovskite structure and have the general formula (a):

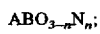

formula (b) is also disclosed:

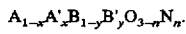

In the formulae, A and A' mean monovalent to tetravalent cations including, for example, $Ca^{2+}$, $Sr^{2+}$ and $Ba^{2+}$ and $Ln^{3+}$ (Ln=lanthanide element) and $Bi^{3+}$, and B and B' mean trivalent to hexavalent cations, including $Nb^{5+}$ and $Ta^{5+}$ and $Ti^{4+}$ and $Zr^{4+}$; moreover, $0<n<3$ and $0<x, y<1$. In said document, however, only compounds having the general formula $A\,B\,O_{3-n}\,N_n$, in which two ions of the same valency may be present simultaneously as A, are disclosed in a concrete manner. Dielectric materials are mentioned as an application, but not coloured pigments. Exclusively the colour of $BaTaO_2N$ (chestnut brown) and $SrTaO_2N$ (orange) is disclosed.

According to the process described in FR-A 2 573 060, the oxide-nitrides mentioned can be prepared by calcining a powder mixture of an oxide, oxide-nitride or nitride with the cation A and an oxide, oxide-nitride or nitride with the cation B in a nitrogen or ammonia atmosphere. Starting from oxides of the elements A and B and ammonia as nitriding agent, the calcining temperature mentioned is 1000° C. and the calcining time approximately 48 hours.

When the process evaluated above was repeated, it was ascertained that the oxide-nitrides prepared herewith have less brilliant hues and are thus unattractive in terms of colour. Moreover, a disadvantage of the previously known process is the very long reaction times at a simultaneously very high temperature. A measure by which, by varying the indices x and/or y in formula (b), the colour of the oxide-nitride may be determined, is neither disclosed nor suggested in FR-A 2 573 060.

An improved process for the preparation of oxide-nitrides having the general formula $LnTaON_2$ wherein Ln stands for a rare earth metal, is described in the as yet unpublished DE patent application P 43 17 421.3 corresponding to U.S. Pat. No. 5,439,660. In said process, products with increased colour brilliance which are suitable as pigments for colouring plastics are obtained. The pigments mentioned, however, cover only the range of orange-yellow to brown-red colours. Moreover, some rare earth metals are extremely expensive starting materials.

Oxide-nitrides having the formula $Ln_2Ta_2O_5N_2$ which crystallise in the pyrochlore structure—see J. Solid State Chem. 107 (1), 39–42 (1993)—are also known.

DESCRIPTION OF THE INVENTION

The object of the present invention is to extend the range of coloured pigments based on oxide/nitrides available hitherto and at the same time to set forth a simple process which makes it possible to adjust the colour during the preparation of the oxide-nitrides by varying the quantity of oxide-nitride-forming starting materials. A further object relates to the provision of oxide-nitrides in the perovskite structure, which are characterised by greater colour brilliance compared with the oxide-nitrides known from FR-A 2 573 060 and are therefore suitable as coloured pigments. The oxide-nitrides to be set forth should cover the entire colour spectrum from yellow to red. Finally, the products should contain only non-toxic constituents. A further object is to organise the previously known production process in such a way that the desired brilliant-colour oxide-nitrides can be obtained preferably in a shorter reaction time than according to the process known hitherto. Finally, a further object is the use of the oxide-nitrides according to the invention with increased colour brilliance as coloured pigments.

A process was found for adjusting the colour during the preparation of oxide-nitrides containing in their structural formula two or three different cations from the series comprising Q, R, S, of which at least two cations have a different valency between +1 and +6, comprising calcining a mixture in powder form containing oxide-nitride-forming metal compounds with the cations of the oxide-nitride in the atomic ratio according to the structural formula and hence determining the crystal structure, under nitriding conditions, which is characterised in that, in order to shift the absorption edge of the oxide-nitride towards the long wave while retaining the crystal structure, the atomic ratio N to O is increased by substituting n equivalents of nitrogen for n equivalents of oxygen, by replacing n equivalents of a cation Q of valency q in the mixture to be calcined by n equivalents of a cation R of valency q+1, where n is any number between more than 0 and the atomic number for Q according to the structural formula in the absence of R, and q is an integer between 1 and 5, and in that the converse procedure is carried out in order to shift the absorption edge towards the short wave.

Other preferred embodiments of the process are disclosed.

Figure 1:
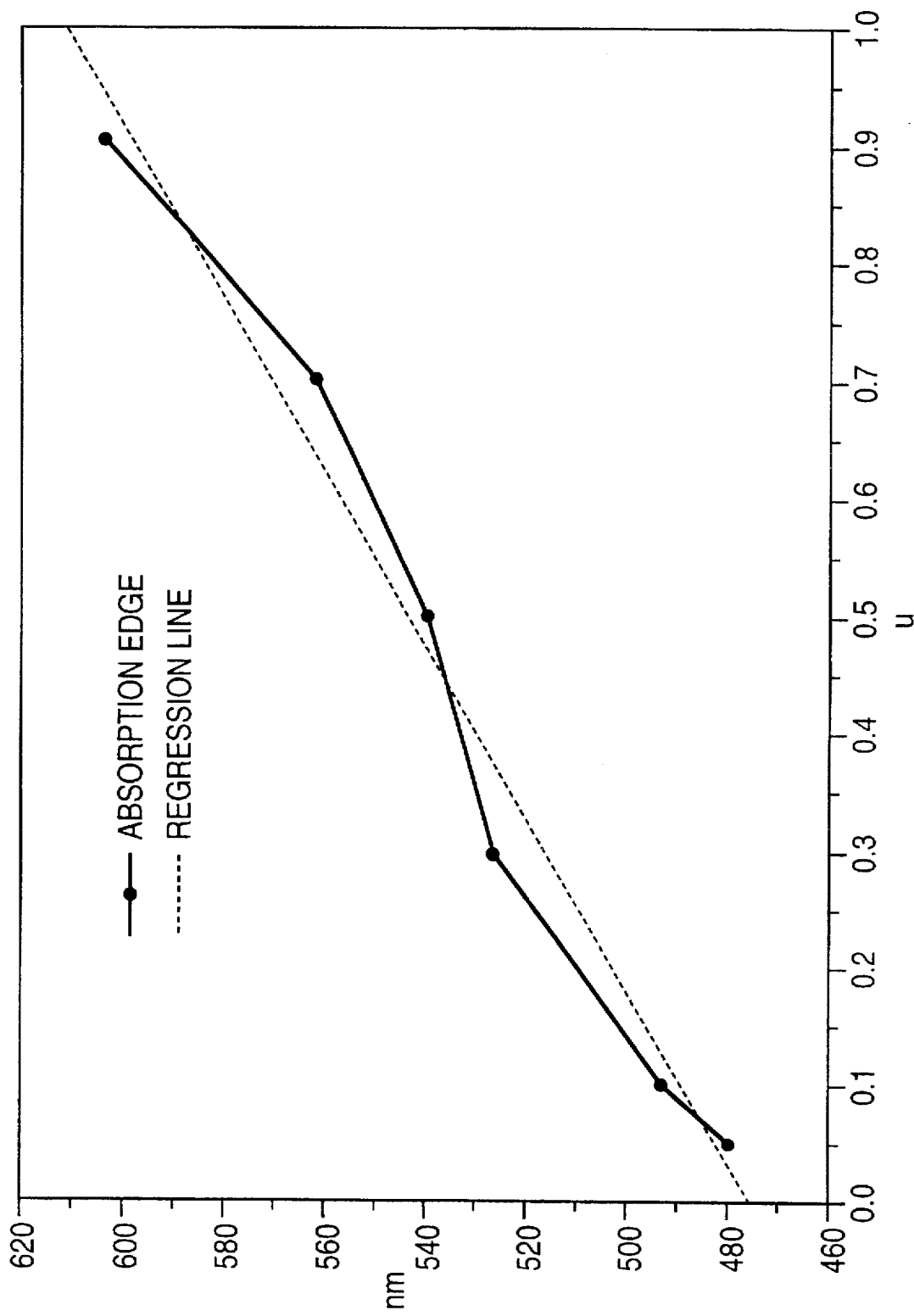
FIG. 1 shows the absorption edge in the system $Ca_{1-x}La_xTaO_{2-x}N_{1+x}$ as a function of x.

According to the invention, it is possible to determine the colour within the colour spectrum from generally yellow to red merely by varying the quantity of cations contained in the oxide. Starting from the structural formula for an oxide-nitride which is present in a particular crystal structure, the ratio of nitrogen to oxygen can be increased by stepwise replacement of the cation Q by a cation R of one unit higher valency, and the colour can thus be shifted towards the long wave; conversely, by stepwise replacement of a cation R by a cation Q of one unit lower valency, the atomic ratio of nitrogen to oxygen is lowered and the colour is thus shifted towards the short wave. As a result of the measure described, a range of pigments covering a large part of the colour spectrum can be built up in a simple manner starting from metal compounds containing a cation Q, a cation R and a cation S. The cations of the series comprising Q, R and S are those with the valency 1 to 6, preferably 2 to 5. The oxide-nitrides of the appropriate type are preferably those containing three different cations; only the marginal members of a series can be oxide-nitrides containing only two different cations.

The oxide-nitrides of the appropriate type usually crystallise in the perovskite structure, the pyrochlore structure, the spinel structure and the elpasolite structure. A particular structural formula can also be assigned to each crystal structure. Starting from an oxide-nitride having the formula $ABO_2N$ crystallising in the perovskite structure, an oxide-nitride having the formula $A_{1-x}A'_x B O_{2-x} N_{1+x}$ may be obtained by stepwise replacement of A by a higher valency cation A', the colour of which oxide-nitride is shifted towards the long wave as a result of the increased N/O atomic ratio. Analogously, the starting oxide-nitride having the general formula $ABON_2$ crystallising in the perovskite structure can be converted by stepwise replacement of the cation B by a cation B' of one unit lower valency to an oxide-nitride having the general formula $A B_{1-x} B'_x O_{1+x} N_{2-x}$ whose absorption edge is shifted towards the short wave. The position of the absorption edge of the marginal members (x equals 0 and x equals 1) is determined by the cations present.

According to the process of the invention, new coloured pigments based on oxide-nitrides, whose atomic ratio of nitrogen to oxygen is decisive for the colour may be obtained; oxide-nitrides crystallised in the pyrochlore structure having the following general formula are preferred:

$$A_xA'_{2-x}B_2O_{5+x}N_{2-x} \qquad (Ia)$$

or $$A'_2B_{2-y}B'_yO_{5+y}N_{2-y} \qquad (Ib)$$

wherein A, A', B and B' stand for one or more cations of the series comprising
A: $Mg^{2+}$, $Ca^{2+}$, $Sr^{2+}$, $Ba^{2+}$, $Zn^{2+}$;
A': $Ln^{3+}$ (=rare earth element), $Bi^{3+}$, $Al^{3+}$, $Fe^{3+}$;
B: $V^{5+}$, $Nb^{5+}$, $Ta^{5+}$, $Mo^{5+}$, $W^{5+}$;
B': $Ti^{4+}$, $Zr^{4+}$, $Hf^{4+}$, $Sn^{4+}$, $Ge^{4+}$, $Si^{4+}$, $Nb^{4+}$, $Ta^{4+}$ and x and y stand for a number between 0 and less than 2, except for $Ln_2Ta_2O_5N_2$, or oxide-nitrides crystallised in the spinel structure having the general formulae:

$$CD_{2-m}D'_mO_{4-m}N_m \qquad (IIa)$$

or $$C_{1-n}C'_nD_2O_{4-n}N_n \qquad (IIb)$$

wherein C, C', D and D' stand for one or more cations from the series comprising
C: $Mg^{2+}$, $Ca^{2+}$, $Mn^{2+}$, $Fe^{2+}$, $Co^{2+}$, $Ni^{2+}$, $Zn^{2+}$;
D: $Al^{3+}$, $Ga^{3+}$, $In^{3+}$, $Ti^{3+}$, $V^{3+}$, $Cr^{3+}$, $Fe^{3+}$, $Co^{3+}$, $Ni^{3+}$;
D': $Ti^{4+}$, $Zr^{4+}$, $Hf^{4+}$, $Sn^{4+}$, $Ge^{4+}$, $Si^{4+}$, $Nb^{4+}$, $Ta^{4+}$;
C': $Al^{3+}$, $Ga^{3+}$, $In^{3+}$, $Ti^{3+}$, $V^{3+}$, $Cr^{3+}$, $Fe^{3+}$, $Co^{3+}$, $Ni^{3+}$ and
m is a number between more than 0 and 2, and
n is a number between more than 0 and 1,
or oxide-nitrides crystallised in the elpasolite structure having the general formula $$A'_2QB'O_{5-z}N_{1+z}$$

wherein z stands for 0, 1 or 2 and when z equals 0 Q is a divalent metal ion C, when z equals 1 Q is a trivalent metal ion A", and when z=2 Q is a tetravalent metal ion D, in accordance with the formulae $$A'_2CBO_5N \qquad (IIIa),$$

$$A'_2A"BO_4N_2 \qquad (IIIb),$$

$$A'_2DBO_3N_3 \qquad (IIIc),$$

wherein A', B, C and D have the above-mentioned meaning and A" stands for $Ln^{3+}$ or $Bi^{3+}$.

The above-mentioned oxide-nitrides in the pyrochlore, spinel and elpasolite structure are new oxide-nitrides, with the exception of the $Ln_2Ta_2O_5N_2$ class of compounds.

Finally, oxide-nitrides previously known according to the formula are obtainable in the perovskite structure according to the above-mentioned process. According to a preferred embodiment of the process described in more detail below— calcining in the presence of mineralisers—oxide-nitrides having a greater colour brilliance than the products obtainable according to the previously known process are, however, obtainable. These are coloured pigments based on oxide-nitrides present in the perovskite structure, whose atomic ratio of nitrogen to oxygen is decisive for the colour, with the general formulae $$A_{1-u}A'_uBO_{2-u}N_{1+u} \qquad (IV)$$

or $$A'B_{1-w}B'_wO_{1+w}N_{2-w} \qquad (V),$$

wherein A, A', B and B' stand for one or more cations from the series comprising
A: $Mg^{2+}$, $Ca^{2+}$, $Sr^{2+}$, $Ba^{2+}$;
A': $Ln^{3+}$ (rare earth metal), $Bi^{3+}$, $Al^{3+}$, $Fe^{3+}$
B: $V^{5+}$, $Nb^{5+}$, $Ta^{5+}$,
B': $Ti^{4+}$, $Zr^{4+}$, $Hf^{4+}$, $Sn^{4+}$, $Ge^{4+}$ and u and w stand for a number between 0 and 1, but when A' means Ln then u is not equal to 1 and w is not equal to 0.

The oxide-nitrides of the perovskite type with increased colour brilliance obtainable according to the invention cover the entire colour spectrum between approximately yellow-green and red taking as a basis in each case one compound type according to formula (IV) or (V) and selected cations for A, A' and B or A', B and B'; colours on the other side of these boundaries may also be obtained sporadically. The oxide-nitrides obtainable according to the invention are characterised by a sharp absorption edge. The absorption edge is usually shifted somewhat towards the long wave compared with products that were obtained according to the previously known process using the same metal compounds. By selecting the numerical value for u in the formula (IV) and w in the formula (V), the atomic ratio of oxygen to nitrogen is defined at the same time. Products having formula (IV) with u about 1 and products having formula (V) with w about 0 are generally in the red range, products with u about 0 and w about 1 are generally in the yellow range. In order to shift the colour from a more yellow to a more red hue, u and w are chosen in such a way during the preparation of the oxide-nitride that the atomic ratio of nitrogen to oxygen increases; in order to shift the colour from a red hue to a yellow hue, u and w are chosen in such a way that the atomic ratio of nitrogen to oxygen decreases. It is thus possible, by calcining a powder mixture containing the cations A, A' and B or A', B and B' in the stoichiometric ratio according to the formula, to obtain yellow to red coloured pigments and thus to build up a range of pigments between yellow-green and red by using three metal compounds each with a different cation by varying u or w. Analogously, measures are taken to adjust the colour for the preparation of oxide-nitrides having the general formulae (I), (II) and (III).

Figure 3:
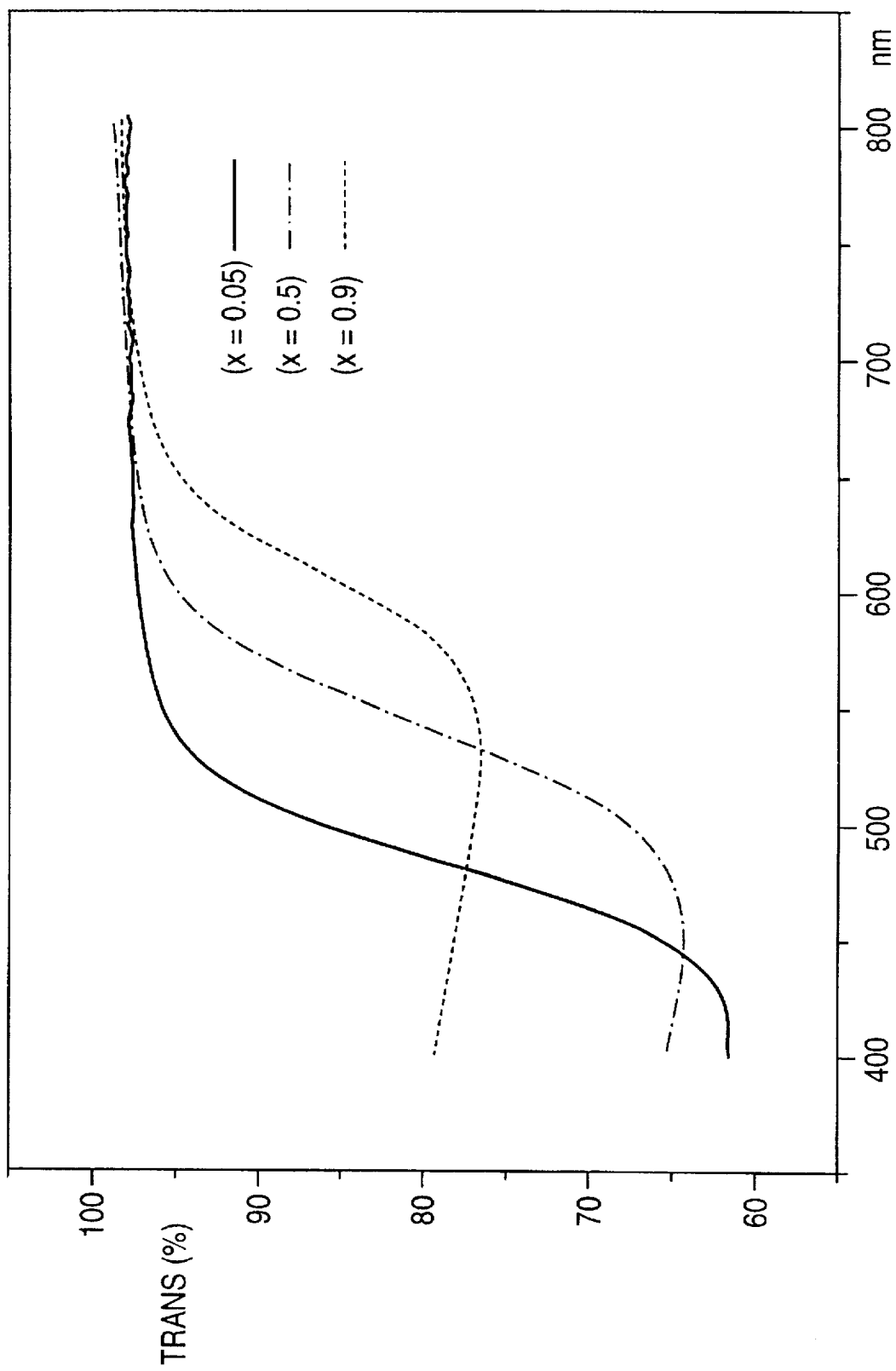
FIG. 3 shows the transmission spectrum of $Ca_{1-x}La_xTaO_{2-x}N_{1+x}$ whereby x is 0.05, 0.5 and 0.9 (examples 1 to 3).

In particular preference, oxide-nitrides having formula (IV) crystallising in the perovskite structure can be prepared according to the preferred process and used as coloured pigments in which A stands for $Ca^{2+}$, $Sr^{2+}$ or $Ba^{2+}$, A' stands for $Ln^{3+}$, B stands for $Ta^{5+}$ and u stands for a number between 0 and less than 1. Ln means a rare earth element with the ordinal number 21, 39, 57–60 and 62–71, lanthanum being preferred. The extent to which the colour is altered by varying the atomic ratio of nitrogen to oxygen can be seen from example 3 and FIG. 1, wherein the absorption edge as a function of x is shown in the system $Ca_{1-u}La_u TaO_{2-u}N_{1+u}$; FIG. 1 also contains the regression line. FIG. 3 shows the transmission spectra of three oxide-nitrides of the system mentioned.

The oxide-nitride-forming metal compounds to be reacted, which each contain one or more of the same or different, but preferably the same cations from the relevant group A, A', B, B', C, C', D, D' and A" are those of the classes of substance already mentioned, preferably oxides, mixed oxides, hydroxides, hydrated oxides, carbonates, nitrates, chlorides, oxide-chlorides, oxide-nitrides, and oxalates. However, the metal compounds to be reacted are also taken to mean those which simultaneously contain two or more cations of different valency, i.e. cations from two groups of the series comprising A, A', B, B', C, C', D, D' and A", for example mixed oxides.

According to a preferred embodiment, the mixture to be calcined contains at least one of the metal compounds to be reacted in the form of a halide, oxide-halide or nitride-halide and at least one of the metal compounds to be reacted in the form of a metal compound containing one or more oxygen atoms, such as, for example, an oxide, hydroxide, oxide-nitrate, carbonate or nitrate.

Preferred oxide/nitrides in which B stands for pentavalent tantalum can be prepared using $Ta_2O_5$, but particularly favourably using hydrated tantalum(V) pentoxide having the formula $Ta_2O_5.aq.$, where aq. means water of hydration and the quantity aq. means 14 to 17% by wt. (see DE-A 42 34 938).

According to a preferred embodiment of the process, which leads to particularly brilliant coloured pigments, a mineraliser, which may be a single substance or a mixture of substances, is a constituent of the mixture to be calcined which is essential to the invention. The preferred alkali and alkaline earth halides effective as mineralisers are those whose melting point is below the calcining temperature.

Alkali and alkaline earth halides, particularly fluorides and/or chlorides of lithium, sodium, potassium, magnesium, calcium, barium and strontium are particularly suitable. Halides may act in the mixture to be calcined at the same time as both mineraliser and metal compound, the cation of which is incorporated in the oxide-nitride during the solids reaction taking place during the calcining process.

A further class of mineralisers is that of ammonium salts of carbonic acid or of a mono- or dicarboxylic acid with 1 to 4 C atoms; ammonium carbonate, ammonium bicarbonate, ammonium acetate and ammonium oxalate are preferred. Finally, sulphur and sulphur compounds as well as fluorides from the series comprising $Na_3AlF_6$, $Na_2SiF_6$ and $AlF_3$ may also be used as mineralisers.

The quantity of mineraliser used may vary widely, namely between 0.1 and 10 parts by weight per part by weight of the mixture of the metal compounds to be reacted and thereby forming the oxide-nitride. One or more mineralisers are used preferably in a quantity of between 0.5 and 5 parts by weight per part by weight of the mixture to be calcined of metal compounds to be reacted.

The powder mixture to be calcined containing the metal compounds to be reacted and preferably one or more mineralisers is advantageously mixed intensively and homogenised before the actual calcining process. Particularly good homogenisation may be brought about by treating the powder mixture in an intensive mill, particularly a ball mill. Alternatively, one or more mineralisers and/or a part of the metal compounds to be reacted in the form of an aqueous solution or suspension with the remaining part of the oxide-nitride-forming metal compounds and/or mineralisers in powder form may be brought into contact with one another; after evaporation of the solvent/suspension agent, the mixture obtained is calcined, optionally after a further milling process.

The actual calcining process takes place in a furnace in the presence of a reducing atmosphere containing a source of nitrogen, preferably ammonia. Apart from the source of nitrogen, such as ammonia and/or nitrogen, the furnace atmosphere may also contain a source of carbon, such as methane, ethane, propane and butane, and hydrogen and/or one or more noble gases. The atmosphere comprises preferably essentially 10 to 100 parts by volume of ammonia and 0 to 90 parts by volume of nitrogen. An atmosphere comprising predominantly ammonia is particularly preferred, but it may also contain up to 10 mole % of nitrogen and/or methane, based on ammonia. The nitriding atmosphere introduced into the furnace should be free from water if possible. In order to be able to recycle the furnace atmosphere at least partially, for example, an atmosphere composed essentially of ammonia, it is advantageous to pass said atmosphere over a drier and subsequently recycle it.

The calcining process is carried out until a pure-phase oxide-nitride has been formed from the raw materials used. The calcining temperature is 700° to 1250° C., generally below 1100° C., mostly between 700° and 1000° C., and particularly preferably between 800° and 900° C. At a calcining temperature in the region of 800° to 900° C. and in a furnace atmosphere comprising essentially ammonia, the calcining time is approximately 10 to 40 hours.

Mineralisers present are partly withdrawn from the calcining mixture during the calcining process itself by decomposition or sublimation. If desirable or required, the calcining process may be followed by a wet treatment in order to dissolve out mineraliser constituents present. The after-treatment may be combined with a customary milling process, for example in a ball mill. Aqueous solutions whose pH is preferably neutral to acid are used for the wet treatment.

Surprisingly, as a result of the measure according to the invention of using one or more mineralisers, it has become possible to obtain more brilliantly coloured oxide-nitrides than was possible according to the previously known process. In comparison with the oxide-nitrides with increased colour brilliance obtainable in the presence of mineralisers, the oxide-nitrides prepared in the absence of mineralisers with the same starting materials and the same molar ratios are always much more matt and mostly browner. It is presumed that the increased colour brilliance of the preferred oxide-nitrides according to the invention is the result of the more complete reaction made possible by the preferred process according to the invention and hence greater phase purity and of a greater particle fineness obtainable due to the process and of a narrower particle size distribution.

It could not have been foreseen that by using mineralisers the calcining process is accelerated and at the same time oxide-nitrides are obtained in greater purity and hence with greater colour intensity and brilliance than is the case with the previously known process. Surprisingly, the choice of the metal compounds to be reacted could be extended and, in a special embodiment of the process, the latter could be simplified by reducing the number of raw materials contained in the mixture to be calcined by using metal halides, metal oxide-halides or metal nitride-halides simultaneously as the metal compound to be reacted and as mineraliser. As a result of the variability according to the invention of the atomic ratio of nitrogen to oxygen in the oxide-nitrides of the same structure and with the same cations, it is possible to build up a complete colour range within a broad range of the colour spectrum by simple means. The extent of the colour ranges, the depth of colour and the colour character can be controlled by the choice of crystal structure and cations.

In view of the high colour brilliance of the oxide-nitrides prepared having the general formula (I) to (V) obtainable by the preferred process according to the invention, a new field of application is opened up for said products, namely the use as coloured pigment. The use of oxide-nitrides in the perovskite structure prepared according to the previously known process as coloured pigment was precluded hitherto by the rather unattractive colours from a colour point of view and the insufficient colour brilliance. As a result of the preferred process according to the invention, it became possible to remedy this shortcoming so that new temperature-stable pigments from the entire yellow to red colour spectrum are now available, which contain no harmful metals from a toxicological aspect.

The coloured pigments obtainable according to the invention are suitable for colouring plastics, lacquers, printing inks and inks and cosmetic articles. The high thermal stability of the oxide-nitrides enables plastics to be integrally coloured with subsequent extrusion and permits the use in stoving enamels. Surprisingly, it was also found that the oxide-nitrides are suitable for the preparation of glass colours that can be burnt in, and for colouring glazes which can be baked at temperatures below 700° C., preferably below 650° C. As experts are interested in very small gradations of colour, particularly in the case of glass colours, a colour range obtainable according to the invention can be used for said purpose. Apart from the oxide-nitrides as coloured pigment, the glass colours contain low-melting glass frits, for example, those which can be baked at a temperature between 450° and 650° C., particularly 450° and 600° C.

The examples below show the process for adjusting the colour, the preparation of some particularly advantageous coloured pigments according to the invention and a colour evaluation thereof using a spectrophotometer over the transmission spectra obtained, and the tristimulus values L*, a* and b* calculated therefrom in the CIE Lab system (DIN 5033).

EXAMPLE 1

A mixture of 0.0184 g of $La_2O_3$, 0.1902 g of $CaCO_3$, 0.4419 g of $Ta_2O_5$ is homogenised with the addition of 0.5 g of $CaCl_2$ and 0.5 g of KCl by milling for 30 minutes in a ball mill. The mixture is subsequently calcined in a corundum boat in an externally heated reaction tube for 40 hours at 850° C. under a stream of ammonia (10 l/h), the reaction taking place to a brilliantly yellow oxide-nitride in the perovskite structure having the formula $Ca_{0.95}La_{0.05}TaO_{1.95}N_{1.05}$. Curve "(x=0.05)" in FIG. 3 shows the transmission spectrum.

Measurement parameters for the transmission spectra in FIG. 1:
Apparatus: Cary 2400 UV VIS spectrophotometer Varian, Darmstadt
Measuring range: 400 to 800 nm
Base lines: Corrected measurement
Weighed sample: 60 mg sample on 4.5 g of $BaSO_4$
Ordinate: Transmission
Abscissa: Wave length in nm
Scan rate: 1 mm $sec^{-1}$
Measuring interval: 2 nm

EXAMPLE 2

A mixture similar to example 1 is used with a different ratio of $La_2O_3$ to $CaCO_3$ (0.1841 to 0.1001 g). It is homogenised and reacted in a similar way to the mixture of example 1 in a stream of ammonia. An orange oxide-nitride having the composition $Ca_{0.5}La_{0.5}TaO_{1.5}N_{1.5}$ is obtained. Curve "(x=0.5)" in FIG. 3 shows the transmission spectrum.

EXAMPLE 3

A mixture similar to example 1 is used with a different ratio of $La_2O_3$ to $CaCO_3$ (0.3314 to 0.0200 g). It is homogenised and reacted in a similar way to the mixture of example 1 in a stream of ammonia. A red oxide-nitride having the composition $Ca_{0.1}La_{0.9}TaO_{1.1}N_{1.9}$ is obtained. Curve "(x=0.9)" in FIG. 3 shows the transmission spectrum.

All the oxide-nitrides with a perovskite structure having the general formula $Ca_{1-x}La_x TaO_{2-x} N_{1+x}$ which change from a yellow to a red hue as x increases may be obtained in the same way.

The table below shows the measured tristimulus values L*, a* and b* in the CIE Lab system as a function of x and the position of the absorption edge in nm:

| x | L* | a* | b* | Abs. edge |
|---|---|---|---|---|
| 0.05 | 98.28 | 0.93 | 19.59 | 478 |
| 0.1 | 97.66 | 2.24 | 20.93 | 490 |
| 0.3 | 96.08 | 5.35 | 14.54 | 524 |
| 0.5 | 94.80 | 9.34 | 17.76 | 538 |
| 0.7 | 93.92 | 8.89 | 8.92 | 563 |
| 0.9 | 92.34 | 7.00 | 2.72 | 604 |

FIG. 1 shows the absorption edge in the system $Ca_{1-x}La_x TaO_{2-x} N_{1+x}$ as a function of x. Both the measured values for the absorption edge and the regression line determined are plotted in FIG. 1.

EXAMPLE 4

A mixture of 0.0866 g of La(NO$_3$)$_3$, 0.2657 g of SrCO$_3$, 0.449 Ta$_2$O$_5$ is homogenised with the addition of 0.5 g of SrCl$_2$ and 0.5 g of KCl by milling for 30 minutes in a ball mill. The mixture is subsequently calcined in a corundum boat in an externally heated reaction tube for 40 hours at 850° C. under a stream of ammonia (10 l/h), the reaction taking place to an orange oxide-nitride having the formula Sr$_{0.9}$La$_{0.1}$TaO$_{1.9}$N$_{1.1}$. All the oxide-nitrides having the general formula Sr$_{1-x}$La$_x$TaO$_{2-x}$N$_{1+x}$ (perovskite structure) which change from an orange to a red hue as x increases may be obtained in the same way.

EXAMPLE 5

A mixture in powder form of CaCl$_2$ and Ta$_2$O$_5$ (molar ratio 4:1), in which CaCl$_2$ serves simultaneously as metal chloride to be reacted and as mineraliser, is calcined in a similar way to example 1 in a furnace in a stream of ammonia for 12 hours at 850° C. A greenish-yellow oxide-nitride is obtained.

EXAMPLE 6

A mixture of 0.2882 g of CaC$_2$O$_4$ and 0.4419 g of Ta$_2$O$_5$ is homogenised with the addition of 0.5 g of CaCl$_2$ and 2 g of KCl by milling for 30 minutes in a ball mill. The mixture is subsequently calcined in a corundum boat in an externally heated reaction tube for 12 hours at 800° C. under a stream of ammonia (10 l/h), the reaction taking place to a yellowish-green oxide-nitride.

EXAMPLE 7

Figure 2:
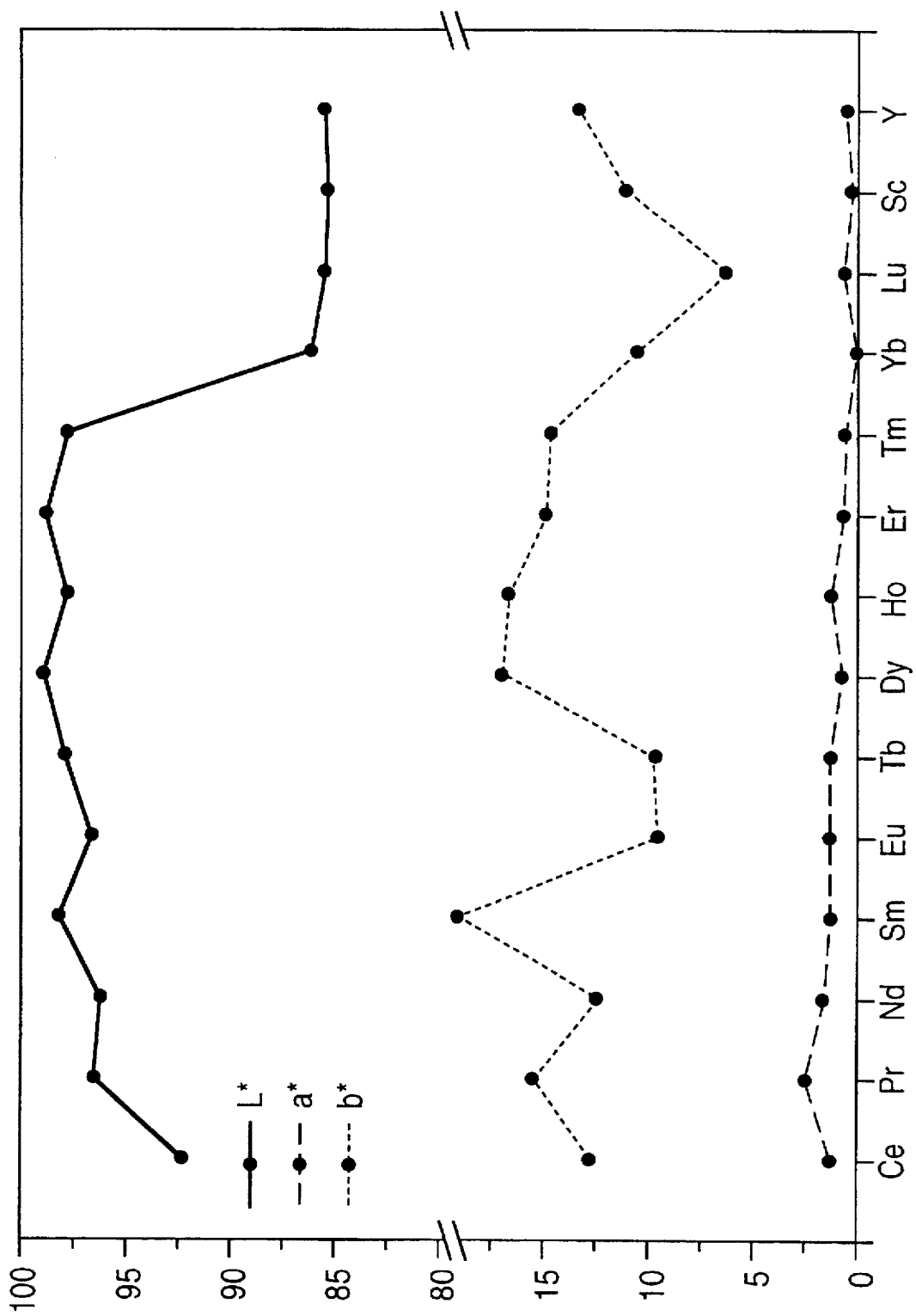
FIG. 2 shows the L*a*b*-values of $Ca_{0.9}Ln_{0.1}TaO_{1.9}N_{1.1}$ as function of the rare earth metal Ln (see example 7).

Compounds of the Ca$_{0.9}$Ln$_{0.1}$TaO$_{1.9}$N$_{1.1}$ type are prepared in a similar way to example 3. The L*a*b* values determined in the customary way as a function of the rare earth metal used can be derived from FIG. 2.

EXAMPLE 8

Oxide-nitride with a pyrochlore structure: A mixture of 0.667 g of Sm(NO$_3$)$_3$·6H$_2$O, 0.05 g of CaCO$_3$ and 0.442 g of Ta$_2$O$_5$ is homogenised with the addition of 1.5 g of CaCl$_2$ by milling for 30 minutes in a ball mill. The mixture is subsequently calcined in a corundum boat in an externally heated reaction tube for 10 hours at 900° C. under a stream of ammonia (4 l/h) dried over KOH, the reaction taking place to a pink-coloured, slightly brown-tinted oxide-nitride having the formula Ca$_{0.5}$Sm$_{1.5}$Ta$_2$O$_{5.5}$N$_{1.5}$. Excess CaCl$_2$ is removed by repeated washing out with water.

EXAMPLE 9

Oxide-nitride with a spinel structure: A mixture of 0.154 g of Mg(NO$_3$)$_2$·6H$_2$O, 0.075 g of Ga$_2$O$_3$, 0.75 g of Al(NO$_3$)$_3$·9H$_2$O is homogenised with the addition of 1 g of MgCl$_2$ by milling for 15 minutes in a ball mill. The mixture is subsequently calcined in a corundum boat in an externally heated reaction furnace for 12 hours at 1200° C. under a stream of ammonia (12 l/h), the reaction taking place to a yellow-grey oxide-nitride having the formula Mg$_{0.6}$Ga$_{0.4}$Al$_2$O$_{3.6}$N$_{0.4}$.

EXAMPLE 10

Oxide-nitride with an elpasolite structure: A mixture of 0.866 g of La(NO$_3$)$_3$·6H$_2$O, 0.0799 g of TiO$_2$ and 0.221 g of Ta$_2$O$_5$ is homogenised with the addition of 1 g of NH$_4$Cl and 0.6 g of NaCl by milling for 15 minutes in a ball mill. The mixture is subsequently calcined in a corundum boat in an externally heated reaction tube for 48 hours at 825° C. under a stream of ammonia (10 l/h), the NH$_4$Cl/NaCl melt subliming and the reaction taking place to a reddishbrown oxide-nitride having the formula La$_2$TiTaO$_3$N$_3$.

EXAMPLE 11

Four oxide-nitrides in the perovskite structure having the general formula Ca$_{1-x}$La$_x$TaO$_{2-x}$N$_{1+x}$ were incorporated in the form of a full strength colour in PVC-plastisol and tested for colour. For the full strength colour, 1 g of the relevant oxide-nitride and 3 g of plastisol were mixed and dispersed in a colour grinder. Coats 0.3 mm thick were produced from the pastes using a slide unit. Gelling took place within 10 minutes by heating at 140° C. The tristimulus values L*a*b* in the CIE Lab system (DIN 5033, Part III) were measured with a spectrophotometer. The tristimulus values and the value of x in the structural formula and the colour of the plastic colouring can be derived from the table.

| Colour | Yellow | Orange | Orange-red | Red |
|---|---|---|---|---|
| x | 0.4 | 0.6 | 0.65 | 0.95 |
| L* | 64.76 | 52.20 | 40.58 | 26.25 |
| a* | −6.29 | 19.8 | 30.13 | 35.71 |
| b* | 40.74 | 34.19 | 26.47 | 15.75 |

EXAMPLE 12

Oxide-nitride with a perovskite structure according to formula (V): A mixture of 2 g of La(NO$_3$)$_3$, 0.5102 g of Ta$_2$O$_5$ and 0.185 g of TiO$_2$ is homogenised and calcined in the air for 12 h at 1000° C. The mixture is subsequently calcined with the addition of 0.3 g of LiCl in a corundum boat in an externally heated reaction tube for 40 h at 900° C. under a stream of ammonia (15 l/h), the LiCl melt subliming and the reaction taking place to a brownish-red oxide-nitride having the formula La(Ti$_{0.5}$Ta$_{0.5}$)O$_{1.5}$N$_{1.5}$

EXAMPLE 13

Oxide-nitride with a perovskite structure according to formula (V): A mixture of 0.37 g of La$_2$O$_3$, 0.22 g of Ta$_2$O$_5$ and 0.21 g of HfO$_2$ is homogenised and calcined in the air for 48 h at 1200° C. The mixture is subsequently calcined with the addition of 0.2 g of LiCl and 0.2 g of KCl in a corundum boat in an externally heated reaction tube for 24 h at 900° C. under a stream of ammonia (15 l/h), the LiCl/KCl melt subliming and the reaction taking place to a pastel-brown oxide-nitride having the formula La(Ti$_{0.5}$Hf$_{0.5}$)O$_{1.5}$N$_{1.5}$.

We claim:

1. A coloured pigment selected from the group consisting of (a) an oxide-nitride crystallized in a pyrochlore structure and having the formula

$$A_xA'_{2-x}B_2O_{5+x}N_{2-x} \tag{Ia}$$

or

$$A'_2B_{2-y}B'_yO_{5+y}N_{2-y} \tag{Ib}$$

wherein A, A', B and B' represent one or more cations selected from the group consisting of A: Mg$^{2+}$, Ca$^{2+}$, Sr$^{2+}$, Ba$^{2+}$, Zn$^{2+}$;

A': Ln$^{3+}$ wherein Ln is a rare earth element, Bi$^{3+}$, Al$^{3+}$, Fe$^{3+}$;

B: $V^{5+}$, $Nb^{5+}$, $Ta^{5+}$, $Mo^{5+}$, $W^{5+}$;

B': $Ti^{4+}$, $Zr^{4+}$, $Hf^{4+}$, $Sn^{4+}$, $Ge^{4+}$, $Si^{4+}$, $Nb^{4+}$, $Ta^{4+}$ and x and y represent a number or fraction thereof between 0 and less than 2, with the proviso that $Ln_2Ta_2O_5N_2$ is excluded, (b) an oxide-nitride crystallized in aspinel structure and having the formula $$C\,D_{2-m}D'_mO_{4-m}N_m \qquad \text{(IIa)}$$

or $$C'_{1-n}C'_nD_2O_{4-n}N_n \qquad \text{(IIb)}$$

wherein C, C', D and D' represent one or more cations of the group consisting of C: $Mg^{2+}$, $Ca^{2+}$, $Mn^{2+}$, $Fe^{2+}$, $Co^{2+}$, $Ni^{2+}$, $Zn^{2+}$;
D: $Al^{3+}$, $Ga^{3+}$, $In^{3+}$, $Ti^{3+}$, $V^{3+}$, $Cr^{3+}$, $Fe^{3+}$, $Co^{3+}$, $Ni^{3+}$;
D': $Ti^{4+}$, $Zr^{4+}$, $Hf^{4+}$, $Sn^{4+}$, $Ge^{4+}$, $Si^{4+}$, $Nb^{4+}$, $Ta^{4+}$;
C': $Al^{3+}$, $Ga^{3+}$, $In^{3+}$, $Ti^{3+}$, $V^{3+}$, $Cr^{3+}$, $Fe^{3+}$, $Co^{3+}$, $Ni^{3+}$ and m is a number or fraction thereof between more than 0 and 2, and n is a number or fraction thereof between more than 0 and 1, and (c) an oxide-nitride crystallized in an elpasolite structure and having the formula $$A'_2QBO_{5-z}N_{1+z}$$

wherein z represents 0, 1 or 2 and when z equals 0, Q is a divalent metal ion C, when z equals 1, Q is a trivalent metal ion A", and when z=2, Q is a tetravalent metal ion D, in accordance with the formulae $$A'_2CBO_5N \qquad \text{(IIIa),}$$

$$A'_2A''BO_4N_2 \qquad \text{(IIIb),}$$

$$A'_2DBO_3N_3 \qquad \text{(IIIc),}$$

wherein A', B, C and D are as defined above and A" represents $Ln^{3+}$ or $Bi^{3+}$.

2. A coloured pigment based on oxide-nitrides in a perovskite structure, and having the formula $$A_{1-u}A'_uBO_{2-u}N_{1+u} \qquad \text{(IV)}$$

or $$A'B_{1-w}B'_wO_{1+w}N_{2-w} \qquad \text{(V),}$$

wherein A, A', B and B' represent one or more cations from the group consisting of A: $Mg^{2+}$, $Ca^{2+}$, $Sr^{2+}$, $Ba^{2+}$;
A': $Ln^{3+}$ wherein Ln is a rare earth metal, $Bi^{3+}$, $Al^{3+}$, $Fe^{3+}$
B: $V^{5+}$, $Nb^{5+}$, $Ta^{5+}$,
B': $Ti^{4+}$, $Zr^{4+}$, $Hf^{4+}$, $Sn^{4+}$, $Ge^{4+}$ and u and w represent a number or fraction thereof between 0 and 1, with the proviso that u is not equal to 1 and w is not equal to 0.

3. A coloured pigment according to claim 2, of the formula (IV), wherein A represents $Ca^{2+}$, $Sr^{2+}$ or $Ba^{2+}$, A' represents $Ln^{3+}$, B represents $Ta^{5+}$ and u represents a number or fraction thereof between 0 and less than 1.

4. In a process for preparing an oxide-nitride selected from the group consisting of (a) an oxide-nitride crystallized in a pyrochlore structure and having the formula $$A_xA'_{2-x}B_2O_{5+x}N_{2-x} \qquad \text{(Ia)}$$

or $$A'_2B_{2-y}B'_yO_{5+y}N_{2-y} \qquad \text{(Ib)}$$

wherein A, A', B and B' represent one or more cations selected from the group consisting of A: $Mg^{2+}$, $Ca^{2+}$, $Sr^{2+}$, $Ba^{2+}$, $Zn^{2+}$;
A': $Ln^{3+}$ wherein Ln is a rare earth element, $Bi^{3+}$, $Al^{3+}$, $Fe^{3+}$;
B: $V^{5+}$, $Nb^{5+}$, $Ta^{3+}$, $Mo^{5+}$, $W^{5+}$;
B': $Ti^{4+}$, $Zr^{4+}$, $Hf^{4+}$, $Sn^{4+}$, $Ge^{4+}$, $Si^{4+}$, $Nb^{4+}$, $Ta^{4+}$ and x and y represent a number or fraction thereof between 0 and less than 2, with the proviso that $Ln_2Ta_2O_5N_2$ is excluded, (b) an oxide-nitride crystallized in a spinel structure and having the formula $$C\,D_{2-m}D'_mO_{4-m}N_m \qquad \text{(IIa)}$$

or $$C_{1-n}C'_nD_2O_{4-n}N_n \qquad \text{(IIb)}$$

wherein C, C', D and D' represent one or more cations of the group consisting of C: $Mg^{2+}$, $Ca^{2+}$, $Mn^{2+}$, $Fe^{2+}$, $Co^{2+}$, $Ni^{2+}$, $Zn^{2+}$;
D: $Al^{3+}$, $Ga^{3+}$, $In^{3+}$, $Ti^{3+}$, $V^{3+}$, $Cr^{3+}$, $Fe^{3+}$, $Co^{3+}$, $Ni^{3+}$;
D': $Ti^{4+}$, $Zr^{4+}$, $Hf^{4+}$, $Sn^{4+}$, $Ge^{4+}$, $Si^{4+}$, $Nb^{4+}$, $Ta^{4+}$;
C': $Al^{3+}$, $Ga^{3+}$, $In^{3+}$, $Ti^{3+}$, $V^{3+}$, $Cr^{3+}$, $Fe^{3+}$, $Co^{3+}$, $Ni^{3+}$ and m is a number or fraction thereof between more than 0 and 2, and n is a number or fraction thereof between more than 0 and 1, (c) an oxide-nitride crystallized in an elpasolite structure and having the formula $$A'_2QBO_{5-z}N_{1+z}$$

wherein z represents 0, 1 or 2 and when z equals 0, Q is a divalent metal ion C, when z equals 1, Q is a trivalent metal ion A", and when z=2, Q is a tetravalent metal ion D, in accordance with the formulae $$A'_2CBO_5N \qquad \text{(IIIa),}$$

$$A'_2A''BO_4N_2 \qquad \text{(IIIb),}$$

$$A'_2DBO_3N_3 \qquad \text{(IIIc),}$$

wherein A', B, C and D are as defined above and A" represents $Ln^{3+}$ or $Bi^{3+}$, and (d) an oxide-nitride having a perovskite structure of the formula $$A_{1-u}A'_uBO_{2-u}N_{1+u} \qquad \text{(IV)}$$

or $$A'B_{1-w}B'_wO_{1+w}N_{2-w} \qquad \text{(V),}$$

wherein A, A', B and B' represent one or more cations selected from the group consisting of A: $Mg^{2+}$, $Ca^{2+}$, $Sr^{2+}$, $Ba^{2+}$;
A': $Ln^{3+}$ wherein Ln is a rare earth metal, $Bi^{3+}$, $Al^{3+}$, $Fe^{3+}$
B: $V^{5+}$, $Nb^{5+}$, $Ta^{5+}$;

B': $Ti^{4+}$, $Zr^{4+}$, $Hf^{4+}$, $Sn^{4+}$, $Ge^{4+}$ and u and w represent a number or fraction thereof between 0 and 1, with the proviso that u is not equal to 1 and w is not equal to 0, comprising calcining a powder mixture containing oxide-nitride forming metal compounds, said metal compounds having the same cations present in a quantity corresponding to the formula of the oxide-nitride being produced, and a mineralizer under nitriding conditions, the improvement wherein in a), b) or c), defined below, an absorption edge (=color) of the oxide-nitride crystallizing in one of the crystal structures is shifted toward long waves while retaining the crystal structure;

a) in preparing an oxide-nitride of formula (Ia) or (IV) a part of an oxide-nitride forming metal compound having a cation A is replaced by an equivalent part of an oxide-nitride forming metal compound having a cation A', or b) in preparing an oxide-nitride of formula (IIb) a part of an oxide-nitride forming metal compound having a cation C is replaced by an equivalent part of an oxide-nitride forming metal compound having a cation C', or c) in preparing an oxide-nitride of formula (IIIa) an oxide-nitride forming metal compound having a divalent cation C is replaced by an oxide-nitride forming metal compound having a cation A" or D', and, correspondingly, in d) or e), defined below, the absorption edge of the oxide-nitride being produced is shifted toward short waves;

d) in preparing an oxide-nitride of formula (Ib) or (V) a part of an oxide-nitride forming metal compound having a cation B is replaced by an equivalent part of an oxide-nitride forming metal compound having a cation B', or, e) in preparing an oxide-nitride of formula (IIa) a part of an oxide-nitride forming metal compound having a cation D is replaced by an equivalent part of an oxide-nitride forming metal compound having a cation D'.

5. A process according to claim 4, wherein the oxide-nitride-forming metal compounds used are selected from the group consisting of oxides, mixed oxides, hydroxides, hydrated oxides, carbonates, nitrates, nitrides, oxide-nitrides, halids, oxide-halids and nitride-halids, the mixture to be calcined additionally contains at least one mineralizer comprising alkali, alkaline earth or ammonium halides, sulphur or sulphur compounds, $Na_3AlF_6$, $Na_2SiF_6$, $AlF_3$ or ammonium salts of carbonic acid or of a mono- or dicarboxylic acid with 1 to 4 C atoms, the amount of mineralizer used is 0.1 to 10 parts by weight per part by weight of the mixture of metal compounds to be reacted, and wherein the mixture is calcined in a reducing atmosphere containing a source of nitrogen at a temperature in the range of 700° to 1250° C. until colour formation is completed.

6. A process according to claim 4 wherein at least one of the oxide-nitride-forming metal compounds is used in the form of a halide, oxide-halide or nitride-halide and at least one of the metal compounds to be reacted is used in the form of a metal compound containing one or more oxygen atoms.

7. A process according to claim 4 wherein the mineralizer used is one or more alkali or alkaline earth halides.

8. A process according to claim 4 wherein 0.5 to 5 parts by weight of one or more mineralizers per part by weight of the mixture of oxide-nitride-forming metal compounds is used in the mixture to be calcined.

9. A process according to claim 4 wherein the powder mixture is calcined at 800° to 900° C.

10. A process according to claim 4 wherein the powder mixture is calcined in an atmosphere of essentially 10 to 100 volume fractions of ammonia and 0 to 90 volume fractions of nitrogen or in an atmosphere comprising essentially ammonia, which may contain up to 10 mole %, based on ammonia, of nitrogen and/or methane.

\* \* \* \* \*